(12) United States Patent
Cooke et al.

(10) Patent No.: US 10,846,673 B2
(45) Date of Patent: Nov. 24, 2020

(54) TECHNIQUES TO CUSTOM DEFINE TRANSACTION SESSIONS

(71) Applicant: NCR Corporation, Atlanta, GA (US)

(72) Inventors: Robert Raymond Cooke, Lake Mary, FL (US); Mark Thomas Alston, Orlando, FL (US)

(73) Assignee: NCR Corporation, Atlanta, GA (US)

( * ) Notice: Subject to any disclaimer, the term of this patent is extended or adjusted under 35 U.S.C. 154(b) by 307 days.

(21) Appl. No.: 15/865,913

(22) Filed: Jan. 9, 2018

(65) Prior Publication Data

US 2018/0150813 A1  May 31, 2018

Related U.S. Application Data

(62) Division of application No. 13/600,755, filed on Aug. 31, 2012, now Pat. No. 9,922,313.

(51) Int. Cl.
*G06Q 20/20* (2012.01)
*G06Q 20/18* (2012.01)

(52) U.S. Cl.
CPC .................................. *G06Q 20/18* (2013.01)

(58) Field of Classification Search
CPC ...................................................... G06Q 20/20
USPC ............................................................. 705/21
See application file for complete search history.

(56) References Cited

U.S. PATENT DOCUMENTS

2004/0104268 A1 * 6/2004 Bailey .................... G06Q 20/32
 235/439
2014/0067567 A1 * 3/2014 Cooke .................... G06Q 20/18
 705/21

* cited by examiner

*Primary Examiner* — Russell S Glass
(74) *Attorney, Agent, or Firm* — Schwegman, Lundberg & Woessner

(57) ABSTRACT

Techniques to custom define transaction sessions are provided. A plugin-based architecture is provided having tasks as units of atomic work that are bound to orchestrators. The orchestrators form plug-in transaction sessions. Specific instances of plugin transaction sessions are deployed and processed from network-based machines, such as but not limited to kiosks.

3 Claims, 3 Drawing Sheets

TECHNIQUES TO CUSTOM DEFINE TRANSACTION SESSIONS

BACKGROUND

Consumers are increasingly using kiosks to conduct business with enterprises. The kiosks come in a variety of sizes and are used for a variety of purposes. Some kiosks are drive through, such as fast food establishments, pharmacies, banks, and the like. Other kiosks are stationary located in gas stations, airlines, grocery stores, department stores, and the like.

In addition, what is considered a kiosk is evolving with today's technology. For example, digital signs now provide advertisements and mechanisms for users to interact with the displays to perform transactions. Such mechanisms include blue tooth communication, Near Field Communication (NFC), Quick Response (QR) code scanning, Wi-Fi communication, and the like.

Even websites and stores online may be viewed as a form of a kiosk. A tremendous amount of services are now available online via website portals. Businesses even attempt to tie their backend systems to existing website services offered by third parties.

By and Large, Large scale Self Service Device (SSD) systems (and websites/applications) must communicate with a heterogeneous mixture of reservation and service providers via numerous disparate and independent interfaces. Many of these interfaces provide similar functionality but must be used in conjunction with custom business rules to provide a complete solution. These interfaces, in combination with custom software, generally use a combination of web services, file transfers, databases, messages, or screen-scraping processes as ad-hoc gateways to communicate with vendor systems.

Self-service software applications are applications designed to allow the end user to perform relatively complex tasks normally requiring expert knowledge through a simplified interface that abstracts away the requirement for such expertise. (E.g., a traveler using an airline check-in kiosk does not need to know the correct sequence of host system commands to execute in order to successfully check in for their flight.)

In order for such systems to operate, they must automate much of the expertise normally provided by an expert human user. To do so, many applications rely upon some form of a centralized processing engine supporting 1) validation, 2) business rules, and 3) service orchestration. Once implemented, such applications typically handle user sessions by gathering information from the user and external services, merging and transforming the information based on business rules, and presenting the user with simplified information and further options. Collectively, from the time when the user first begins using the application until the time that they complete their interaction, the sequence of steps executed is referred to as a session flow. Due to the highly specific interactions required by individual applications and the organizations, encoding session flow into self-service applications requires supporting enormous programming variability.

To date, many solutions that have targeted similar problems have been built upon tremendously expensive Business Process Management (BPM) and Business Process Execution Language (BPEL) platforms. The major weakness of these approaches is that they are too large, complex, and unwieldy to work for smaller scale self-service applications. Moreover, such systems are not typically designed with the low latency required to support near real time user interaction. Instead, most real-world implementations of self-service applications have constructed ad-hoc solutions that border on the edge of unmanageable complexity. Combined with the variability discussed above, such solutions have traditionally suffered from extremely high maintenance and customization costs.

SUMMARY

In various embodiments, techniques to custom define transaction sessions are presented. According to an embodiment, a method for assembling a transaction session is provided.

Specifically, a validation programming module, a business rule programming module, and an orchestration programming module are provided. Next, instances of the validation programming module, the business rule programming module, and the orchestration programming module are permitted to be custom organized in order to form an executable transaction session.

DETAILED DESCRIPTION

Figure 1:
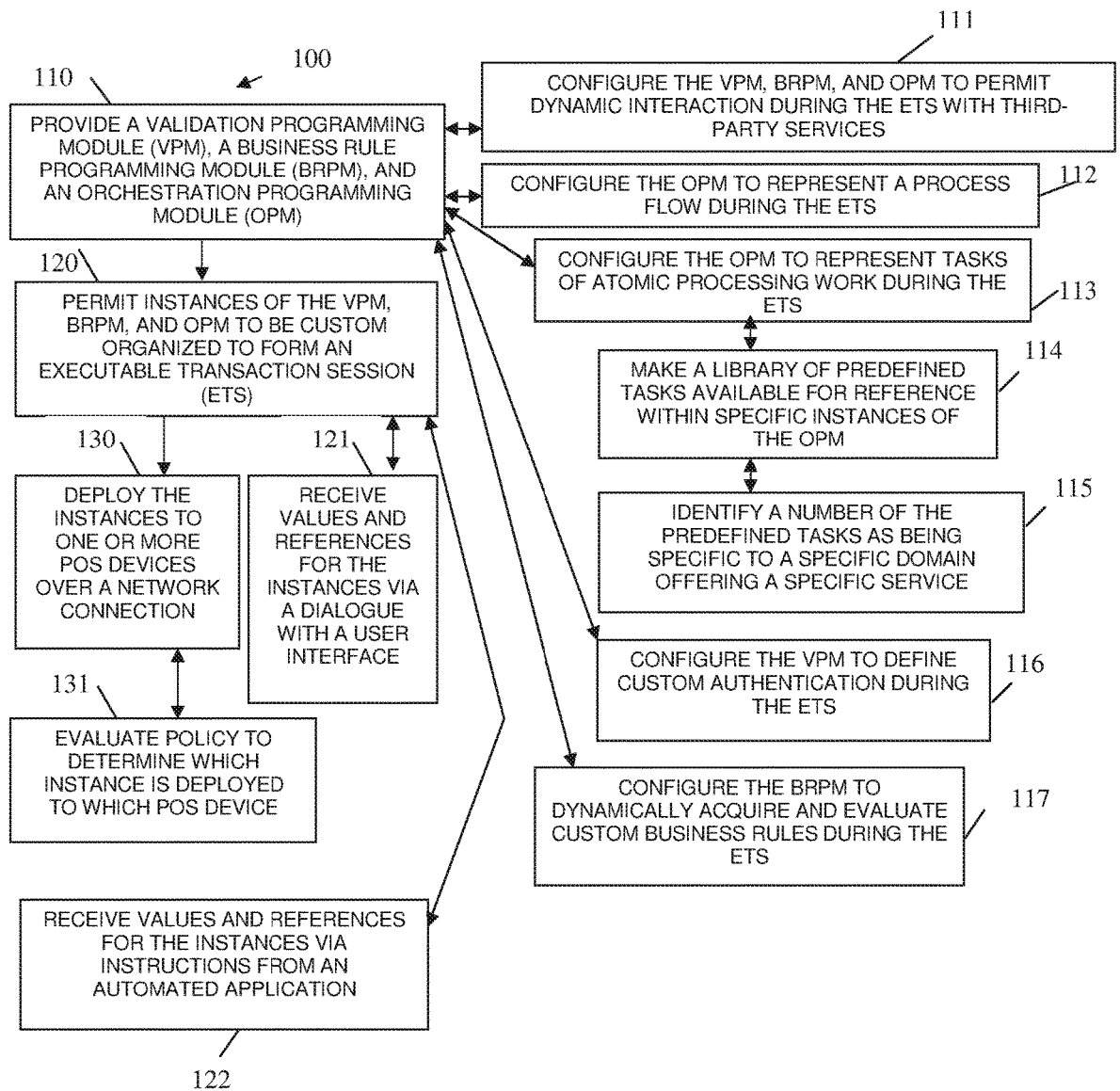
FIG. 1 is a diagram of a method for assembling a transaction session, according to an example embodiment.

FIG. 1 is a diagram of a method 100 for assembling a transaction session, according to an example embodiment. The method 100 (hereinafter "session assembler") is implemented as instructions programmed and residing on a non-transitory computer-readable (processor-readable) storage medium and executed by one or more processors, server, web-based Internet portal, cloud, virtual machine (VM), etc.) over a network connection. The processors are specifically configured and programmed to process the session assembler. The session assembler may also operate over a network. The network is wired, wireless, or a combination of wired and wireless.

The session assembler discusses providing the framework for building modularized session flows for transactions, whereas the processing of a specific one of these session flows is discussed below with reference to the FIG. 2.

Some initial examples and context are provided before discussion of the session assembler proceeds with reference to the FIG. 1.

The session assembler is a plug-in based architecture that allows for rapid development of highly individualized session flows while adhering to a well-defined framework for reduced complexity and enhanced long term maintainability.

For example, a customer may wish to apply some set of arbitrary rules to certain transactions and route them to alternative processors. As an example, there may be a need to conditionally route certain customers to certain service providers or booking systems if they are flying on a given airline during a certain time of day.

If the customer owned an NCR® Shared Travel Framework solution, then NCR® would produce new plug-in rules to apply to the customer system to provide the conditional re-routing in an automated fashion. NCR® can quickly and accurately provide these software configuration changes in less time and at lower development costs than has traditionally been achievable in the industry.

In an embodiment, the session assembler architecture is a component and framework built with the Java® programming language. The architecture is constructed with best of breed software engineering patterns and practices such as Inversion of Control (IoC), Dependency Injection (DI), and Aspect Oriented Programming (AOP). Additional capabilities are provided via Commercial Off-The Shelf (COTS) software toolkits, such as VMware™ Spring Framework and Spring Integration Toolkit.

The reference implementation of the session assembler architecture is designed to work with a separate component referred to as the Host Abstraction Layer (HAL). The HAL exposes a set of standardized domain operations implemented by external host systems and used by self-service applications built in the target domain. Additionally, the HAL exposes a messaging API that is directly utilized by the session assembler architecture through service orchestration.

Individual orchestrations within the session assembler architecture represent various sub-flows involved in executing the overall session flow. For example, one orchestration may be responsible for locating and validating an airline reservation, another may be responsible for helping the user change their seat assignment, and yet another may be responsible for generating boarding documents. Orchestrations are, in turn, composed of tasks representing atomic units of work. Tasks can be implemented as individual plugins or contained within libraries of plugins and are bound to an orchestration using simple XML configuration. Orchestrations and tasks are typically domain specific in that they are directly coded against a specific domain model whereas the session assembler architecture component itself is completely domain agnostic. In this regard, the session assembler architecture implements an engine that executes domain specific operation sets implemented within orchestrations and tasks.

Both orchestrations and tasks are dynamically discovered and loaded during initialization. Static eXtensible Markup-Language (XML) bindings determine how orchestrations are invoked. Invocation is typically triggered by the receipt of a message from another service or component.

It is within this context that the processing associated with the session assembler is now discussed with reference to the FIG. 1.

At 110, the session assembler provides a validation programming module, a business rule programming module, and an orchestration programming module. These entities may be viewed as programming templates or even objects in an object oriented programming environment. Some processing that is capable of being defined by these entities was presented above. Moreover, these entities maybe viewed as plugin modules into POS architectures having transaction session engines to define specific transaction sessions.

According to an embodiment, at 111, the session assembler configures the validation programming module, the business rule programming module, and the orchestration programming module to permit dynamic interaction during the executable transaction session (discussed below with reference to the processing at 120) with third-party services. In other words, API calls to third-party services can be custom embedded in the modules as needed. The modules may also be configured to call adapters to third-party interfaces.

In an embodiment, at 112, the session assembler configures the orchestration programming module to represent the process flow during the executable transaction session. So, the orchestration programming module may be viewed as a container that binds the other two types of modules together into specific processing flows.

In still another situation, at 113, the session assembler configures the orchestration module to represent tasks of atomic processing work during the executable session. That is, specific processing actions are defined via tasks and the orchestration module binds these tasks together in custom defined processing sequences.

Continuing with the embodiment of 113 and at 114, the session assembler makes a library of predefined tasks available for reference within specific instances of the orchestration programming module. This promotes reuse within an enterprise and allows standard tasks to be provided more easily. Tasks may also be used across orchestration modules for a given product implementation or even within a single orchestration module.

Still continuing with the embodiment of 114 and at 115, the session assembler identifies a number of the predefined tasks as being specific to a specific domain offering a specific service. This was discussed above with the initial context to the FIG. 1.

In an embodiment, at 116, the session assembler configures the validation programming module to define custom authentication during the executable transaction session.

According to an embodiment, at 117, the session assembler configures the business rule programming module to dynamically acquire and evaluate custom business rules during the executable transaction session.

At 120, the session assembler permits instances of the validation programming module, the business rule programming module, and the orchestration programming module to be custom organized to form an executable transaction session.

In an embodiment, at 121, the session assembler receives values and references for the instances via a dialogue with a user interface.

In another case, at 122, the session assembler receives values and references for the instances via instructions from an automated application.

According to an embodiment, at 130, the session assembler dynamically deploys the instances to one or more POS devices over a network connection, The executable transaction session may also be coupled and reside on a server for access from remote clients that access the server.

Continuing with the embodiment of 130 and at 131, the session assembler evaluates policy (such as enterprise policy that may also be custom defined) to determine which instance is deployed to which POS device.

Figure 2:
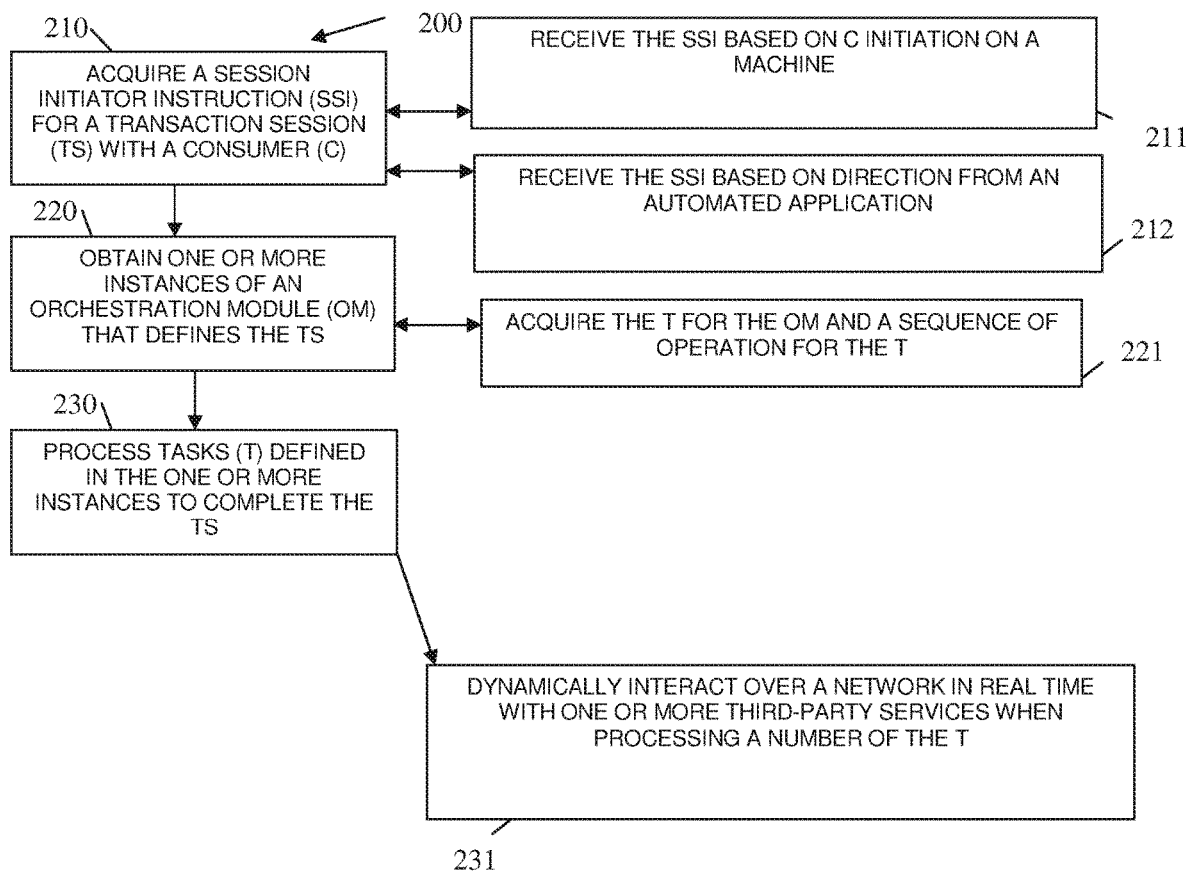
FIG. 2 is a diagram of a method for processing a transaction session, according to an example embodiment.

FIG. 2 is a diagram of a method 200 for processing a transaction session, according to an example embodiment. The method 200 (hereinafter "transaction session engine") is implemented as instruction and programmed within a non-transitory computer-readable (processor-readable) storage medium that executes on one or more processors of a network-based machine or stand-alone machine; the processors of the machine are specifically configured to execute the interface provider. The interface provider may also be operational over a network; the network is wired, wireless, or a combination of wired and wireless.

In an embodiment, the transaction session engine processes on a specific POS device and receives an instance of an executable transaction session from the session assembler as discussed above with reference to the FIG. 1.

At 210, the transaction session engine acquires a session initiator instruction for a transaction session with a consumer. This can occur in a variety of manners.

For example, in one case at 211, the transaction session engine receives the session initiator instruction based on the consumer initiation on a machine, such as the POS device that processes the transaction session engine. Here, the POS may be a kiosk that the consumer approaches and sends the session initiator instruction, which is then detected and acquired by the transaction session engine.

In another case, at 212, the transaction session engine receives the session initiator instruction based on direction from an automated application. So, the POS device may receive direction from another system to begin the session.

At 220, the transaction session engine obtains one or more instances of an orchestration module that custom defines the transaction session.

In an embodiment, at 221, the transaction session engine acquires the tasks (defined below with reference to the processing at 230) for the orchestration module and a sequence of operation for those tasks.

At 230, the transaction session engine processes the tasks defined in the one or more instances of the orchestration module to complete and process the transaction session.

According to an embodiment, at 231, the transaction session engine dynamically interacts over a network in real time with one or more third-party services when processing a number of the tasks.

Figure 3:
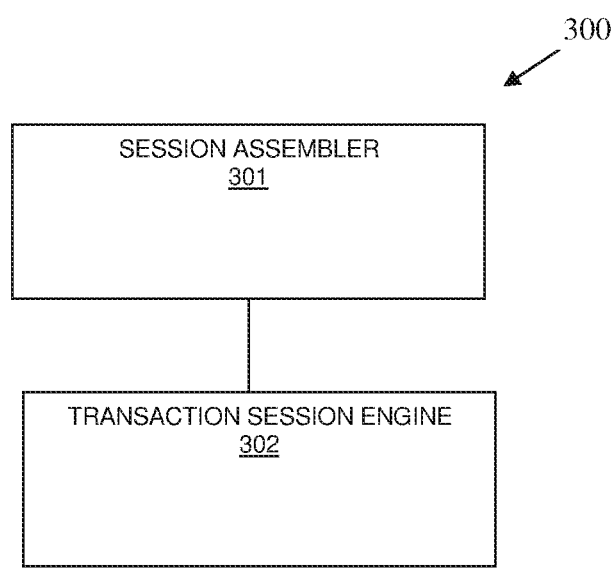
FIG. 3 is a diagram of a transaction session builder system, according to an example embodiment.

FIG. 3 is a diagram of a transaction session builder system 300, according to an example embodiment. The components of the transaction session builder system 300 are implemented as executable instructions and programmed within a non-transitory computer-readable (processor-readable) storage medium that execute on one or more processors of a network-based server (cloud, proxy, Virtual Machine (VM), etc.) or a standalone machine (client device (laptop, tablet, computer), cashier-manned checkout station, self-service checkout station, kiosk, etc.); the processors are specifically configured to execute the components of the transaction session builder system 300. The transaction session builder system 300 may also be operational over a network; the network is wired, wireless, or a combination of wired and wireless.

The transaction session builder system 300 includes a session assembler 301 and a transaction session engine 302. Each of these components and the interactions of each component are now discussed in turn.

The transaction session builder system 300 includes a one or more network-based or standalone machine processors accessible, which can be accessible over a network connection. The one or more processors include execution instructions for the session assembler 301, which resides and is programmed within a non-transitory computer-readable storage medium and processed on the one or more processors. Example processing associated with the session assembler 301 was presented in detail above with reference to the FIG. 1.

The session assembler 301 is configured to permit a transaction session to be custom defined as plugin modules and the custom defined transaction session is dynamically delivered to one or more instances of the transaction session engine over a network.

According to an embodiment, the session assembler 301 is configured to provide an interface library of modules for custom defining the transaction session.

The transaction session builder system 300 also includes a one or more network-based or standalone machine processors, which may also be accessible over a network connection. The one or more processors include execution instructions for the transaction session engine 302, which resides and is programmed within a non-transitory computer-readable storage medium and processed on the one or more processors. Example processing associated with the transaction session engine 302 was presented in detail above with reference to the FIG. 2. It is also noted that multiple instances of the transaction session engine 302 can be deployed over multiple networks and machines, such that each machine includes an instance of the transaction session engine 302.

The transaction session engine 302 is configured to dynamically interpret and execute the transaction session when interacting with a consumer via the device of the transaction session engine 302, which is different from the device associated with the session assembler 301.

According to an embodiment, the different processor having the transaction session engine 302 is a POS device for an enterprise geographically dispersed from the session assembler 301.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. § 1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A system comprising:
   a processor configured with session assembler implemented within a non-transitory computer-readable storage medium and that executes on the processor; and
   a different processor configured with a transaction session engine implemented within a non-transitory computer-readable storage medium and that executes on the different processor;
   wherein the session assembler is configured to permit a transaction session to be custom defined as plugin modules comprising customized organization and configuration of a validation programming module, a business rule programming module, and an orchestration programming module, and wherein the session assembler delivers the transaction session to the transaction session engine, the transaction session engine is configured to dynamically interpret and execute the transaction session when interacting with a consumer via the different processor, and wherein the transaction session engine processes the validation programming module to perform custom authentication for the transaction session, wherein the transaction session engine processes the business rule programming module to perform custom evaluation of business rules, and wherein the transaction session engine processes the orchestration programming module to perform custom tasks for the transaction session.

2. The system of claim 1, wherein the session assembler is configured to provide an interface and a library of modules for custom defining the transaction session.

3. The system of claim 1, wherein the different processor is a Point-Of-Sale device for an enterprise.

\* \* \* \* \*